United States Patent
Lucash et al.

(10) Patent No.: US 9,158,800 B2
(45) Date of Patent: Oct. 13, 2015

(54) PROVIDING CONTENT ITEMS FOR NON-STANDARD CONTENT ITEM SLOTS

(71) Applicants: Nathan Peter Lucash, San Francisco, CA (US); Brandon Murdock Pearcy, San Francisco, CA (US)

(72) Inventors: Nathan Peter Lucash, San Francisco, CA (US); Brandon Murdock Pearcy, San Francisco, CA (US)

(73) Assignee: Google Inc., Mountain View, CA (US)

( * ) Notice: Subject to any disclaimer, the term of this patent is extended or adjusted under 35 U.S.C. 154(b) by 159 days.

(21) Appl. No.: 13/724,391

(22) Filed: Dec. 21, 2012

(65) Prior Publication Data

US 2014/0181156 A1    Jun. 26, 2014

(51) Int. Cl.
*G06F 17/00* (2006.01)
*G06F 17/30* (2006.01)

(52) U.S. Cl.
CPC .................................. *G06F 17/30312* (2013.01)

(58) Field of Classification Search
CPC ....... G06Q 10/06; G06Q 10/08; G06Q 30/06; G06Q 30/0241; G06Q 30/0277; G06Q 30/0261; G06Q 30/0271; G06Q 30/0276; G06Q 30/0603; G06F 17/211; G06F 17/212; G06F 17/3089; G06F 17/30994; G06F 2203/04806; G06F 3/0481; G06F 3/04815; G06F 3/04817; G06F 3/0485; G06F 3/1407; H04N 21/4886; H04N 21/26275; H04N 13/006

See application file for complete search history.

(56) References Cited

U.S. PATENT DOCUMENTS

| | | | |
|---|---|---|---|
| 5,379,229 A * | 1/1995 | Parsons et al. | 700/215 |
| 5,555,369 A * | 9/1996 | Menendez et al. | 715/762 |
| 6,820,277 B1 | 11/2004 | Eldering et al. | |
| 7,263,668 B1 * | 8/2007 | Lentz | 715/801 |
| 7,594,189 B1 * | 9/2009 | Walker et al. | 715/811 |
| 7,694,221 B2 | 4/2010 | Fortes | |
| 7,890,882 B1 * | 2/2011 | Nelson | 715/788 |
| 7,904,799 B1 | 3/2011 | Underwood et al. | |
| 7,983,959 B2 | 7/2011 | Chickering et al. | |

(Continued)

FOREIGN PATENT DOCUMENTS

| | | |
|---|---|---|
| EP | 2068251 A2 * | 6/2009 |
| JP | 2012-073863 A | 4/2012 |

(Continued)

OTHER PUBLICATIONS

PCT International Search Report/Written Opinion for PCT/US2013/074276, DTD Mar. 28, 2014, 9 pages.

(Continued)

*Primary Examiner* — Augustine K Obisesan
(74) *Attorney, Agent, or Firm* — Foley and Lardner LLP; John D. Lanza

(57) ABSTRACT

In some instances, a resource may have display space that is independent of the first-party content and which may be used for presenting third-party content items. The display of third-party content items may also depend on one or more device parameters. For a non-standard space, such as a content item slot having a non-standard ratio of height to width, a determination of the number of content items that can fill the non-standard content item slot may be made based on the height of the content item slot, the width of the content item slot, and a minimum content item size. The number of content items may be selected and formatted, such as by modifying a font size, based on the height and width of the content item slot and the minimum content item size. Data may be output to effect display of the formatted content items with the resource.

17 Claims, 4 Drawing Sheets

(56) References Cited

U.S. PATENT DOCUMENTS

| | | |
|---|---|---|
| 8,001,105 B2 | 8/2011 | Bolivar et al. |
| 8,086,957 B2 | 12/2011 | Bauchot et al. |
| 8,090,706 B2 | 1/2012 | Bharat |
| 8,196,162 B2 | 6/2012 | Van De Klashorst |
| 8,214,454 B1* | 7/2012 | Barnes et al. ............... 709/217 |
| 8,335,712 B1 | 12/2012 | Crucian et al. |
| 8,577,181 B1 | 11/2013 | Badros et al. |
| 8,738,448 B2 | 5/2014 | Zhang |
| 2004/0148274 A1* | 7/2004 | Warnock et al. ............. 707/2 |
| 2004/0267965 A1 | 12/2004 | Vasudevan et al. |
| 2005/0021403 A1 | 1/2005 | Ozer et al. |
| 2005/0041647 A1 | 2/2005 | Stinnie |
| 2006/0064630 A1* | 3/2006 | Balinsky ..................... 715/500 |
| 2006/0107204 A1* | 5/2006 | Epstein ....................... 715/517 |
| 2007/0162844 A1* | 7/2007 | Woodall et al. ............. 715/517 |
| 2007/0174291 A1 | 7/2007 | Cooper et al. |
| 2008/0262912 A1* | 10/2008 | Gargi ............................ 705/14 |
| 2008/0262913 A1 | 10/2008 | Reitz et al. |
| 2008/0270890 A1 | 10/2008 | Stern |
| 2009/0012863 A1 | 1/2009 | Saephan |
| 2009/0012905 A1 | 1/2009 | Mawani et al. |
| 2009/0085921 A1 | 4/2009 | Do et al. |
| 2009/0150253 A1 | 6/2009 | Williams et al. |
| 2009/0172730 A1 | 7/2009 | Schiff et al. |
| 2009/0187535 A1* | 7/2009 | Warnock et al. ............. 707/2 |
| 2009/0216364 A1* | 8/2009 | Grissom ....................... 700/214 |
| 2009/0307188 A1 | 12/2009 | Oldham et al. |
| 2010/0042749 A1* | 2/2010 | Barton ........................ 710/1 |
| 2010/0057569 A1 | 3/2010 | Cantelmo et al. |
| 2010/0114696 A1 | 5/2010 | Yang |
| 2010/0115064 A1* | 5/2010 | Tsun et al. .................... 709/219 |
| 2010/0198694 A1 | 8/2010 | Muthukrishnan |
| 2011/0007096 A1 | 1/2011 | Miyano |
| 2011/0035345 A1 | 2/2011 | Duan et al. |
| 2011/0119124 A1 | 5/2011 | Pradeep et al. |
| 2011/0145730 A1 | 6/2011 | Zhou |
| 2011/0153421 A1 | 6/2011 | Novikov et al. |
| 2012/0310735 A1 | 12/2012 | Kniaz et al. |
| 2013/0024757 A1* | 1/2013 | Doll et al. ................... 715/204 |
| 2013/0305144 A1* | 11/2013 | Jackson et al. .............. 715/246 |
| 2014/0095514 A1* | 4/2014 | Filev et al. ................... 707/748 |

FOREIGN PATENT DOCUMENTS

| | | |
|---|---|---|
| WO | WO-02/27574 A1 | 4/2002 |
| WO | WO 2006055751 A2 * | 5/2006 |
| WO | WO-2009/111123 A1 | 9/2009 |
| WO | WO-2010/088479 A2 | 8/2010 |

OTHER PUBLICATIONS

International Search Report and Written Opinion mailed Mar. 27, 2014 in PCT Application No. PCT/US2013/074279 (11 pages).

US Advisory Action on U.S. Appl. No. 13/725,302, dtd May 26, 2015, 3 pgs.

US Notice of Allowance on U.S. Appl. No. 13/659,520 DTD Mar. 13, 2015, 12 pgs.

US Office Action on U.S. Appl. No. 13/627,334 DTD May 18, 2015.

US Office Action on U.S. Appl. No. 13/627,334, dtd Nov. 18, 2014, 19 pages.

US Office Action on U.S. Appl. No. 13/725,302 DTD Mar. 20, 2015, 27 pgs.

US Office Action on U.S. Appl. No. 13/725,302 mailed Oct. 28, 2014, 24 pages.

US Office Action on U.S. Appl. No. 13/725,302 mailed Jun. 4, 2014, 23 pages.

* cited by examiner

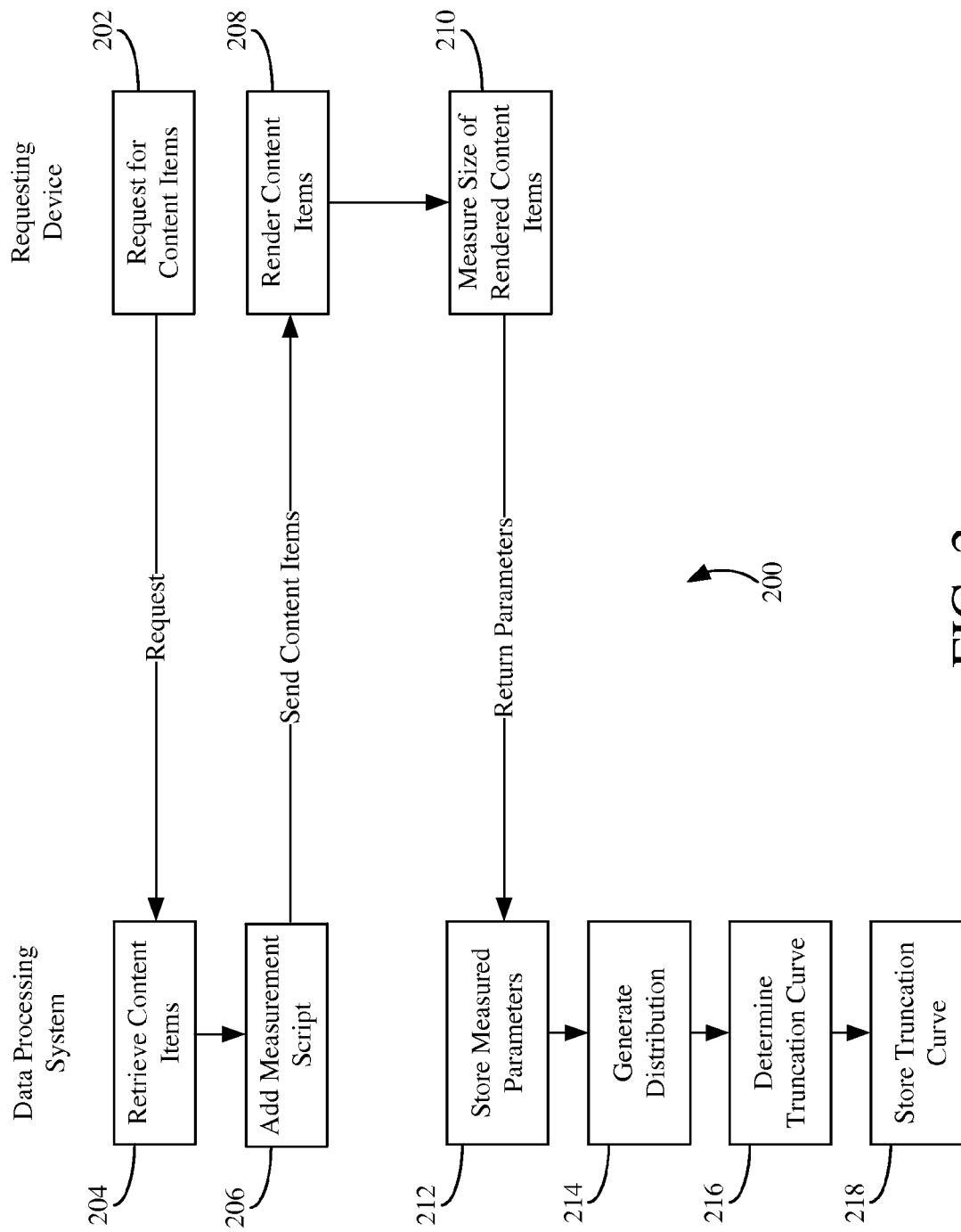

PROVIDING CONTENT ITEMS FOR NON-STANDARD CONTENT ITEM SLOTS

BACKGROUND

In a networked environment such as the Internet or other networks, first-party providers can provide information for public display on resources, for example web pages, documents, applications, and/or other resources. The first-party content can include text, video, and/or audio information provided by the first-party providers via, for example, a content server for display on the Internet. Additional third-party content can also be provided by third-party content providers for display on the resources together with the information provided by the first-party providers. Thus, a person viewing a resource can access the information that is the subject of the resource, as well as the third-party content that may or may not be related to the subject matter of the resource.

SUMMARY

In one implementation, a method for providing one or more content items for a content item slot may include receiving a height and width of a content item slot of a resource having a non-standard content item slot ratio without a format parameter associated with a pre-defined slot size or slot ratio. One or more requesting device parameters may be received, such as a browser type, browser version, or operating system. A determination may be made of a number of content items based on the height and width of the content item slot and a minimum content item size. The minimum content item size may be based, at least in part, on the one or more requesting device parameters. One or more content items may be selected equal to the determined number and may be formatted based on the minimum content item size, the height, and the width. Display data to effect display of the formatted content item may be output.

In another implementation, a system for providing one or more content items for a content item slot may include one or more data processors and one or more storage devices storing instructions that cause the data processors to perform various operations. The operations may include receiving a height and a width of a content item slot having a non-standard content item slot ratio. A browser type parameter and an operating system parameter for a requesting device may be received. A determination may be made for a number of content items based on the height and width of the content item slot and a minimum content item size. The minimum content item size may be based, at least in part, on the browser type parameter and the operating system parameter. One or more content items may be selected equal to the determined number and may be formatted based on the minimum content item size, the height, and the width. Data to effect display of the formatted content items may be outputted.

In still another implementation, a computer readable storage device may store instructions that cause one or more data processors to perform several operations. The operations may include receiving a height and a width of the content item slot. The ratio of the height to the width may be a non-standard content item slot ratio. A determination of a number of content items may be based on the height of the content item slot, the width of the content item slot, and a minimum content item size. The minimum content item size may be based on a click-through-rate associated with a font size. One or more content items may be selected equal to the determined number and may be formatted based on the minimum content item size, the height, and the width. Data to effect display of the formatted content items may be outputted.

BRIEF DESCRIPTION OF THE DRAWINGS

Various embodiments taught herein are illustrated by way of example, and not by way of limitation, in the figures of the accompanying drawings, in which:

FIG. 2 is a block diagram depicting an example process for generating a distribution for sizes of various content items;

Figure 1:
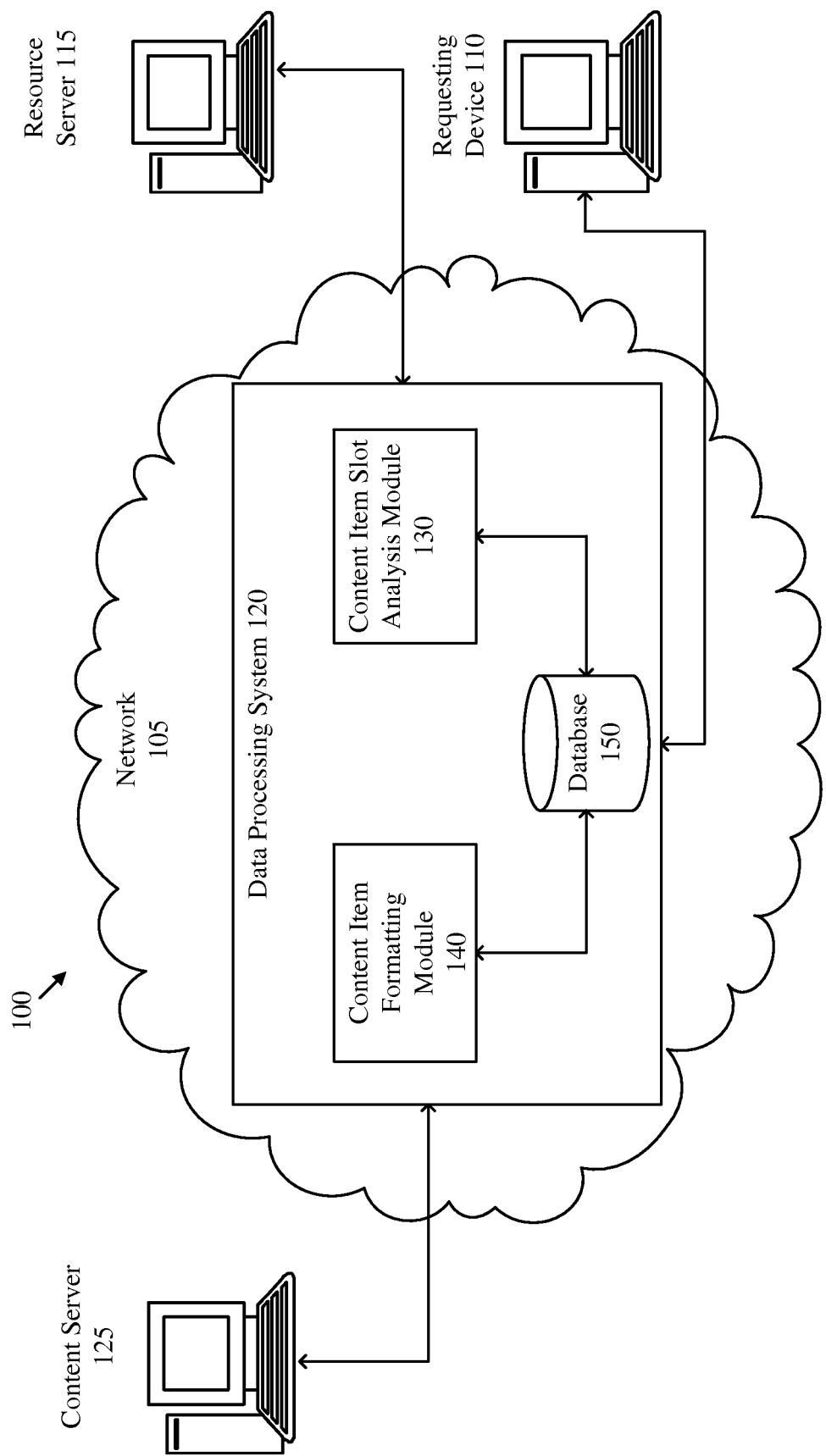
FIG. 1 is an illustration of an example system for providing third-party content items for a resource.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and embodiments of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a user device or requesting device) can view a resource, such as a web page, via the Internet by communicating with a resource server, such as a web page server. The resource may include content that is the subject of the resource from the first-party provider, as well as additional third-party provided content, such as advertisements. In one implementation, responsive to receiving a request to access a web page, a web page server can communicate with a data processing system, such as a content placement system, to request a third-party content item for insertion into the rendering of the web page displayed at the computing device. The content placement system can select the appropriate third-party content item and provide it to the resource server, such as a web page server, for display with the resource, such as a web page.

In another implementation, a server may provide resource data to the computing device, which may include one or more content item tags, such as advertisement tags. By way of example only, an advertisement tag may be a piece of web page code associated with rendering a third-party content item in a content item slot of a web page. In this implementation, the advertisement tags may cause the computing device to make a request for one or more third-party content items. The content placement system can identify one or more third-party content items and provide the one or more content items to the computing device for display with the resource.

A determination of the size of a third-party content item, such as an advertisement, may be useful to maximize the number of content items that can be rendered for a specified dimensional area and/or to optimize how the content item is rendered. For example, the size of a third-party content item may depend on the content, the format of the content, the application and/or operating system on which the content item is to be rendered (e.g., different web browsers may render text differently, etc.), the screen resolution of a computing device displaying the content item, etc. A determination of the size of a content item and the dimensions of where the content item is to be rendered with the resource may be useful for providing display data to effect display of the content item without truncating the content item and/or may be used to optimize the appearance of the content item for those dimensions (e.g., a content item may be displayed with a larger font size, etc.).

FIG. 1 illustrates an example system 100 for providing information via at least one computer network, such as the network 105. The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

The system 100 may include at least one data processing system 120. The data processing system 120 can include at least one logic device such as a computing device having a processor to communicate via the network 105, for example with a resource server 115, a requesting device 110, and a content server 125. The data processing system 120 can include one or more data processing modules, such as a content item slot analysis module 130, and/or a content item formatting module 140. Data processing system 120 may also include a database 150 for storing data.

The requesting device 110 may include one or more interface devices (e.g., a laptop, desktop, tablet, personal digital assistants, smart phones, portable computer, etc.). An interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more interface devices may be internal to a housing of the requesting device 110 (e.g., a built-in display, microphone, etc.) or external to the housing of the requesting device 110 (e.g., a monitor or speaker connected to the requesting device 110, etc.), according to various implementations. For example, requesting device 110 may include an electronic display capable of displaying resources, such as web pages, or other resource or content data received from resource server 115, content server 125, and/or data processing system 120.

Content server 125 may include one or more devices connected to network 105 that provide content items. The content items may include images, flash animations, video or graphical content, text-based content, or any combination thereof. In one implementation, the content server 125 may be an advertiser and the content items may include advertisements. However, the systems and methods may also be applied to any other type of content server 125 and/or content item.

The resource server 115 can include a computer having a server configured to host at least one resource, such as a web page or other resource. For example, the resource server 115 may be a computer server (e.g., an FTP server, file sharing server, web server, etc.) or a combination of servers (e.g., a data center, a cloud computing platform, etc.). The resource server 115 can provide resource data or other content (e.g., text documents, PDF files, and other forms of electronic documents) to the requesting device 110. In one implementation, the requesting device 110 can request resource data from the resource server 115 via the network 105 to effect display of the resource on a display of the requesting device 110.

In one implementation, the data processing system 120 can receive, via the network 105, a request for a content item to display with a resource. In one implementation, the resource may include a web page. The resource server 115 may include first party provider of a resource, who may have an agreement with the data processing system 120 for the system to provide content items to display with one or more resources of the resource server 115. The requesting device 110 may be a computing device operated by a user (represented by a device identifier), which, when accessing a resource of the resource server 115, can make a request to the data processing system 120 for content to be displayed with the resource, for instance.

As will be described in greater detail below, the data processing system 120 may receive data associated with a content item slot for a resource provided by resource server 115. For example, the data processing system 120 may receive data associated with the content item slot that may include a slot id, a position of the slot in the document object model (DOM) of the resource, parameters for a slot length and/or width, or the like.

In some implementations, a content item slot analysis module 130 of the data processing system 120 may receive parameters indicative of the dimensions of a content item slot of a resource and/or data indicative of the result of rendering one or more content items by the requesting device 110 (such as the dimensional size of a rendered content item and/or whether the third-party content item is truncated when rendered in a content item slot of a resource). Regarding the former, the content item slot analysis module 130 may receive parameters corresponding to a height and a width of a content item slot of a resource (e.g., 200 pixels high by 100 pixels wide) and one or more parameters of a requesting device 110 (e.g., a type of web browser, an operating system, etc.). As will be described in greater detail herein, the parameters may be used to determine a number of content items for the content item slot and/or to format one or more content items based on the height and/or width of the content item slot. In some implementations, a minimum content item size may be determined by content item slot analysis module 130 based on the one or more parameters of the requesting device 110 and based on one or more previously rendered content items, as described below.

The analysis module 130 may receive data indicative of the result of rendering one or more content items by one or more requesting devices 110. For example, the analysis module 130 may be configured to provide a script with a third-party content item that is transmitted to the resource server 115 and/or to a requesting device 110. In some implementations, the analysis module 130 may provide the script with all third-party content items transmitted to the resource server 115 and/or to the requesting device 110. In other implementations, the analysis module 130 may provide the script with a predetermined percentage of content items transmitted to the resource server 115 and/or to the requesting device 110. For example, the analysis module 130 may provide the script with two percent of the content items that are transmitted to the resource server 115 and/or to the requesting device 110. Receiving data indicative of the result of rendering of one or more content items by a percentage of the requesting devices 110 may be sufficient to establish a statistically significant sample size. In still further implementations, the script may be provided with five percent, ten percent, fifty percent or more of the content items.

Figure 3:
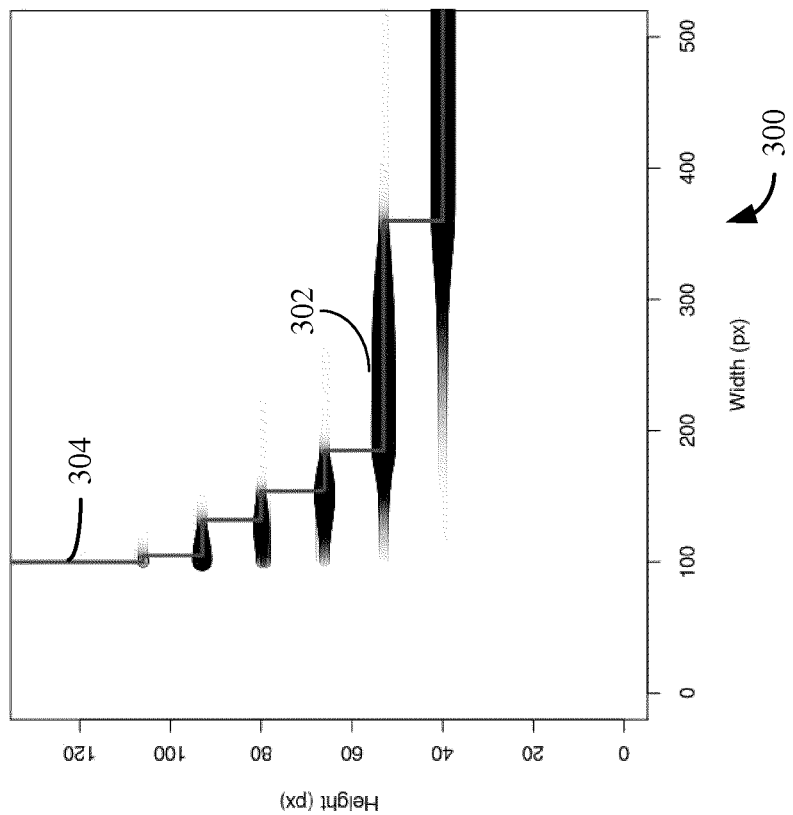
FIG. 3 illustrates a height and width distribution for a single rendered content item.

The script, when executed, may determine a height and a width of a rendered content item. Such rendering may occur on one or more requesting devices 110 and/or on one or more experimental devices (not shown). The determined heights and widths of content items may be returned to the analysis module 130 such that a statistical distribution of the heights and widths of several content items may be generated. An example distribution is shown in FIG. 3 and will be discussed in greater detail below. Using the statistical distribution, a determination may be made by analysis module 130 for a minimum content item size based on the statistical distribution. In some instances, a curve, such as a truncation curve discussed below, may be determined based on a probability that a percentage of the content items will have an equal or less height or width for a selected height or width. For example, for a selected width, 95% of the content items may have equal or less height than the value where the selected width intersects with the curve. Thus, a minimum content size may be determined using the statistical distribution and curve. Of course other bases for the minimum content size may be used and will be discussed in greater detail below.

Data processing system 120 may also include a content item formatting module 140 configured to format or otherwise optimize one or more third-party content items for display with a resource on a requesting device 110. For example, content item formatting module may modify a font size of a textual content item to maximize the size of the content item based on a size of the content item slot in which the content item will be displayed. Of course other formatting may occur as well, such as changing a font type, cropping images, etc.

The system 100 may include a database 140 (such as part of data processing system 120, as shown, or otherwise) to organize, store, retrieve, and/or transmit data. The database 140 can be configured to interact with any component of system 100, data processing system 120, analysis module 130, content item formatting module 140, content server 125, resource server 115, and/or requesting device 110. In one implementation, database 140 may store one or more statistical distributions for various web browsers, web browser versions, operating systems, etc. Thus, analysis module 130 may select a statistical distribution from database 140 based on the one or more parameters for requesting device 110.

FIG. 2 depicts a block diagram of an example process 200 of generating a statistical distribution representing display sizes of content items. Process 200 may be executable by, for example, the components of system 100 described in FIG. 1 for providing content items for display with a resource on a requesting device. Process 200 may be executed for one or more content items independent of a request for a content items from a requesting device (e.g., done internally on an experimental device or otherwise) or process 200 may be performed in response to a request for content items from a requesting device.

Process 200 may include requesting one or more content items by a requesting device, such as requesting device 110 of FIG. 1 (block 202). In some implementations, the request may include a size of a content item slot, such as a height and width, amongst other data for the content item slot. The request may be transmitted to a data processing system, such as data processing system 120 described above. In some instances, the height and width of the content item slot may be stored in a database for use with one or more returned dimensional size parameters, as described below.

The data processing system may retrieve the content items for the content item slot (block 204). In some implementations, one or more content items may be locally stored by the data processing system. In other implementations, the data processing system may request one or more content items from a remote source, such as a remote database, a third-party content provider, and/or otherwise.

A measurement script may be included with the one or more content items (block 206). The measurement script may be configured to determine the dimensions of a rendered content item on the requesting device and/or whether the rendered content item is truncated (e.g., for a textual content item, whether the text is truncated, such as by the text extending beyond the dimensional space and/or wrapping around to the next line) when executed by the requesting device. In some instances, the script may be configured to vary several parameters, such as font size, font type, etc., in a background process to determine the dimensions of a rendered content item for multiple configurations of the requesting device. Of course the script may be configured for other purposes beyond measuring the dimensions of a rendered content item and/or whether the rendered content item is truncated.

In some instances, several scripts may be executed on several different requesting devices to determine the dimensions of rendered content items for requesting devices having different configurations (e.g., a computing device running a first operating system and a first web browser, a different computing device running a second, different operating system and a second, different web browser, etc.). Thus, the resulting data may be indicative of the dimensions of a content item for several display parameters and/or several computing device configurations. In some implementations, the script may be executed in real time to provide data to a server and/or may be executed while offline. The script may be configured to return parameters indicative of the dimensional size of one or more rendered content items to the data processing system, such as data processing system 120.

In one example implementation, a script may be configured to determine the dimensions of a rendered content item and/or whether the content item is truncated based only on the current configuration of the requesting device, such as a computing device that currently displays fonts in Times New Roman at a 12 point font size (of course other standards may be used, such as pixel width, ems, percent, etc.). Such a script may provide data for relevant display configurations while reducing the complexity of the script. For example, it may be less likely that a requesting device would render a content item in 64 point font when rendering a resource, such as a web page.

The content items and the script may be transmitted to the requesting device for the requesting device to render the one or more content items (block 208). The script may be executed to measure the size of the rendered one or more content items (block 210). In some instances, the script may vary several parameters, such as font size, font type, etc., in a background process and re-render the one or more content items to determine the dimensions of the re-rendered one or more content items for the various configurations The dimensional size parameters, e.g., height and width, may be transmitted to the data processing system and stored, either locally or remotely (block 212). In some instances, the dimensional size parameters may be used to determine one or more parameter metrics. The parameter metrics may include an average dimensional size parameter, standard deviations, variances, ranges, or any other metrics that are indicative of a statistic of a plurality of parameters.

Given a large number of content items that are rendered and measured, a distribution of content item heights and widths can be generated (block 214). A probabilistic determination may be made for whether a content item may truncate if rendered into a content item slot of known size for a known web browser type, web browser version, operating system, language, etc. based on the distribution. A truncation curve may be determined based on the distribution (block 216). For example, a 95% truncation curve may be determined based on the distribution such that, for any given width, 95% of the content items may have an equal or lesser height than that indicated by the truncation curve. One example truncation curve is shown in FIG. 3. The truncation curve may be stored in a database (block 218) and/or otherwise for further use, as will be described below. In some implementations, the stored truncation curves and distributions may be updated as additional dimensional size parameters are included.

FIG. 3 illustrates an example distribution graph 300 that may be generated for five thousand rendered content items in the English language in an Arial font face at a 9 point font size, in a first browser type on a first operating system. A comparison between the width and height of the rendered content items are plotted on graph 300. The "clouds" represent the number of content items that need a given width/height ratio to be rendered. The thicker and darker "clouds" represent more content items included as part of the distribution for the particular height. For example, for a width of about 100 pixels, a majority of content items may need about 90 pixels of height to be rendered. As the width increases, the content items need less height. For example, for a width of 200 pixels, the content items may need a height of about 50 pixels, as represented by cloud 302. At a width of 300 pixels or more, the content items may only need a height of about 40 pixels.

The solid line 304 represents a 95% truncation curve. That is, for a known width, 95% of the content items require a height equal to or less than the height indicated by the truncation curve. As the width increases, the content items may need less height to be rendered, as indicated by the truncation curve. Of course other truncation curves having other probabilities may be used, such as 99%, 90%, 75%, 50%, etc.

Figure 4:
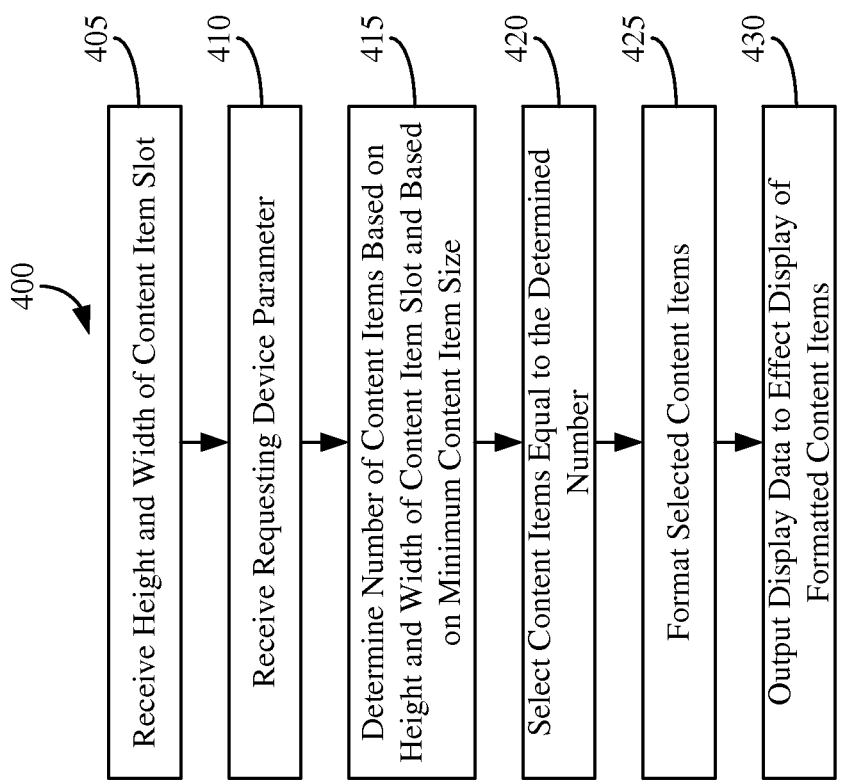
FIG. 4 is a flow chart depicting an example method for providing content items for display with a resource.

FIG. 4 depicts a flow diagram illustrating an example method 400 providing content items for display with a resource. A requesting device, such as requesting device 110 of FIG. 1, associated with a device identifier may request a resource from a resource server, such as resource server 115 of FIG. 1. The resource may include one or more content item slots for displaying one or more third-party content items when the resource is rendered for display by the requesting device. In some implementations, the data for the requested resource may include a content item tag, such as an advertisement tag. By way of example only, an advertisement tag may be a piece of web page code associated with rendering a third-party content item in a content item slot of a web page. In some instances, when a first-party content provider has a non-standard content item slot, the first-party content provider may specify the width and height for the content item slot as part of the content item tag. Such a non-standard content item slot may be defined by having a height and a width that forms a non-standard content item slot ratio. An example a content item tag specifying a width and a height is:

```
<script type="text/javascript"><!--
content_width = 720;
content_height = 90;
//--></script>
<script type="text/javascript"
src="http://content.contentserver.com/pagecontent/show_content.js">
</script>
```

Based on the content item tag and/or otherwise, a request for one or more third-party content items for a content item slot of a resource may be received by a data processing system, such as data processing system 120, from the requesting device and/or resource server. The request of the present example includes a height and a width of the content item slot that is received by the data processing system (step 405). The request for third-party content items may include additional data, such as a unique slot id for the content item slot, data about parameters related to the content item slot, or data used to select relevant content items. In some implementations, a format parameter associated with a pre-defined slot size or slot ratio may be omitted.

One or more requesting device parameters may also be received by the data processing system (step 410). For example, the one or more requesting device parameters may include a web browser type, a web browser version, an operating system type, a language, etc.

A determination may be made for a number of content items based on the height and width of the content item slot and a minimum content item size (step 415). For example, a content item slot having a width of 200 pixels and a height of 100 pixels may have a minimum content item size determined based on data for one or more previously rendered content items. Such data for one or more previously rendered content items may be the basis for a truncation curve, such as curve 304 of FIG. 3. In some instances, the truncation curve may be selected based on the one or more requesting device parameters. For instance, a first truncation curve may be used for a first operating system and a first web browser while a second truncation curve may be used for a second, different operating system and a second, different web browser. Of course other requesting device parameters may be used.

In the prior example, the height corresponding to a 200 pixel width for 95% of content items using the truncation curve 304 of FIG. 3 is 50 pixels. Accordingly, the minimum content item size may be determined to be 200 pixels wide by 50 pixels high. Using the total height and width of the content item slot, a number of content items may be determined. For example, for the minimum content item size of 200 pixels wide by 50 pixels high, the determined number of content items may be 2 for the present content item slot.

In some instances, the minimum content item size may be determined based on other factors. For instance, a statistical analysis of presented content items may indicate that content items having a content item size of 50 pixels high by 100 pixels wide may have a click-through-rate of 10% while a content item size of 75 pixels by 100 pixels wide may have a click-through-rate of 4%. Thus, a minimum content item size of 50 pixels by 100 pixels may be determined based on the click-through-rate. For a content item slot having a width of 100 pixels and a height of 250 pixels, the determined number of content items may be 5.

In another example, a statistical analysis of presented content items may indicate that content items having a font size of 12 point font may have a click-through-rate of 10% while a font size of 9 point font may have a click-through-rate of 4%. Thus, a minimum content item size may be determined based on the click-through-rate associated with the font size. Still other bases for the minimum content item size may be used.

Content items may be selected to be equal to the determined number (step 420). For example, an auction may be performed by the data processing system to select the content items based on one or more criterions (e.g., relevance to the content of the first-party provider's resource, relevance to one or more characteristics associated with the device identifier for the requesting device, a cost-per-click value assigned by third-party content providers, etc.). In some implementations, the auction may be performed by a remote system and/or the content items may be retrieved from a remote source. Of course the content items may be selected randomly and/or through other ways.

The selected content items may be formatted by the data processing system (step 425). For example, for a content item slot having a height of 258 pixels and a width of 102 pixels, 5 content items having a minimum content item size of 100 pixels by 50 pixels may not completely fill the content item slot when rendered. The selected content items may be formatted, such as by increasing a font size, to substantially fill the content item slot. In some instances, the formatting, such as font size, may be increased until an estimated predetermined percentage of the content item slot is expected to be filled. For instance, a font size for the content items may be selected and/or incremented until the content items are estimated to fill 96% of the area of the content item slot. Thus, the area of the non-standard content item slot may be maximized. Display data to effect display of the formatted content items may be output to the requesting device and/or to the resource server of the first-party provider (step 430).

Figure 5:
FIG. 5 is an illustration of a resource having non-standard content item slots.

FIG. 5 depicts examples of two non-standard content item slots 510, 520 that a first-party content provider may request to be filed with third-party content items by specifying a height and width of the non-standard content item slot. A horizontal content item slot 510 of a first-party content provider resource 500 is shown as a wide, but not tall, content item slot, and the vertical content item slot 520 of the first-party content provider resource 500 is shown as a tall, but not wide, content item slot. Utilizing process 400 described above, content items may be selected and display data for the content items may be outputted to a requesting device or a resource server for displaying content items within content item slots 510, 520.

Figure 6:
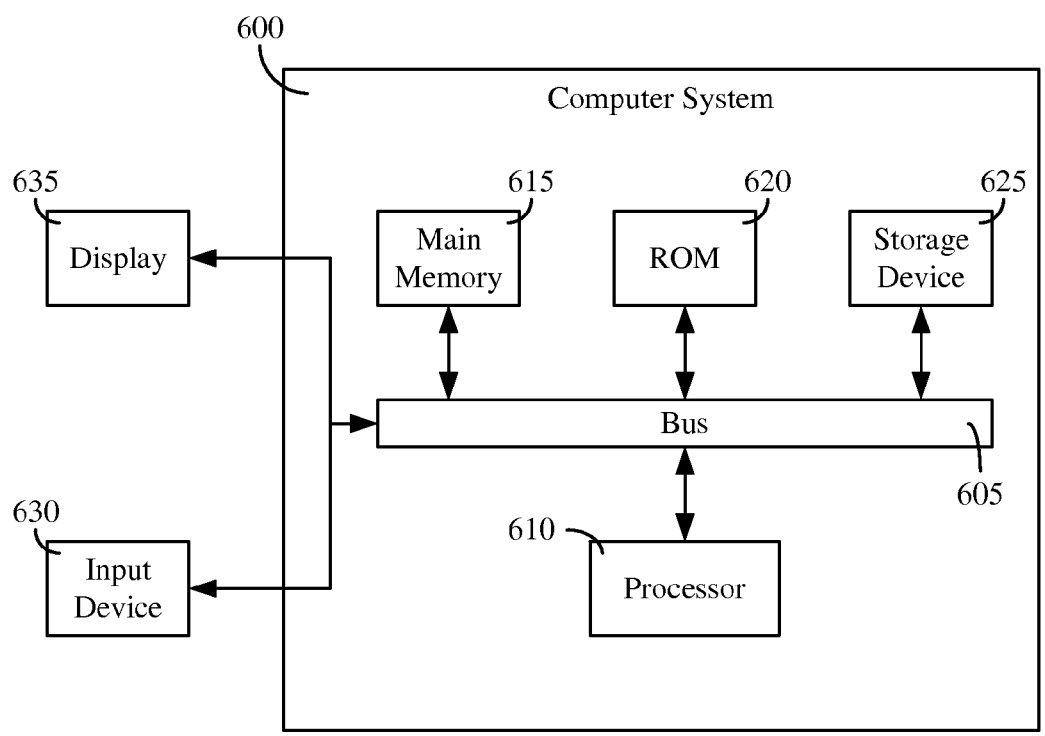
FIG. 6 is a block diagram illustrating an architecture for a computer system that may be employed to implement various elements of the systems and methods.

FIG. 6 is a block diagram of a computing system or device 600 in accordance with some illustrative implementations. The computing system or device 600 can be used to implement any or all parts of system 100, including requesting device 110, resource server 115, data processing system 120, content server 125, content item slot analysis module 130, content item formatting module 140, and/or database 150. The computing system 600 may include a bus 605 or other communication component for communicating information and a processor 610 or processing module coupled to the bus 605 for processing information. The computing system 600 can also include one or more processors 610 or processing modules coupled to the bus for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. In some other implementations, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software embodied on a tangible medium, firmware, or hardware, including the structures disclosed in this specification and their structural equivalents, or in combinations of one or more of them.

For situations in which the systems discussed here collect information about users, or may make use of information about users, the users may be provided with an opportunity to control whether programs or features that may collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for several different applications, such as a web browser and several streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a non-transitory computer-readable medium, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" may encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. A processor can receive instructions and data from a read-only memory or a random access memory or both. The essential elements of a computer are a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for providing one or more content items for a content item slot, comprising:
    receiving, by one or more data processors, a height and a width of a content item slot of a resource, wherein a ratio of the height of the content item slot to the width of the content item slot is a non-standard content item slot ratio, and wherein no format parameter associated with a pre-defined slot size or slot ratio is received;
    receiving, by one or more data processors, one or more requesting device parameters;
    determining, by one or more data processors, a minimum content item size for the content item slot of the resource based on the one or more requesting device parameters, a distribution of previously rendered content item sizes, and one of the height or the width, wherein the one or more requesting device parameters comprise at least one of a browser type, a browser version, or an operating system, wherein the distribution of previously rendered content item sizes is a truncation curve selected based on the one or more requesting device parameters;
    determining, by one or more data processors, a number of content items based on the height, the width, and the minimum content item size;
    selecting, by one or more data processors, one or more content items equal to the determined number;
    formatting, by one or more data processors, the one or more selected content items based on the minimum content item size, the height, and the width; and
    outputting, by one or more data processors, data to effect display of the one or more formatted content items.

2. The method of claim 1, wherein the step of formatting comprises:
    modifying, by one or more data processors, a font size for the one or more selected content items.

3. The method of claim 2, wherein each selected content item of the one or more selected content items has a height and a width, wherein the font size is selected such that a sum of the heights of the one or more selected content items is maximized for the height of the content item slot or a sum of the widths of the one or more selected content items is maximized for the width of the content item slot.

4. The method of claim 1, wherein the minimum content item size is further based on a click-through-rate.

5. The method of claim 1, wherein the minimum content item size is further based on a click-through-rate associated with a font size.

6. A system for providing one or more content items for a content item slot, the system comprising:
    one or more data processors; and
    one or more storage devices storing instructions that, when executed by the one or more data processors, cause the one or more data processors to perform operations comprising:
        receiving a height of the content item slot and a width of a content item slot, wherein a ratio of the height of the content item slot to the width of the content item slot is a non-standard content item slot ratio,
        receiving a browser type parameter and an operating system parameter for a requesting device,
        determining a number of content items based on the height of the content item slot, the width of the content item slot, and a minimum content item size, wherein the minimum content item size is based on a truncation curve, wherein the truncation curve is selected based on the browser type parameter and the operating system parameter,
        selecting one or more content items equal to the determined number,
        formatting the one or more selected content items based on the minimum content item size, the height of the content item slot, and the width of the content item slot, and
        outputting data to effect display of the one or more formatted content items.

7. The system of claim 6, wherein the operation of formatting comprises:
    modifying a font size for the one or more selected content items.

8. The system of claim 7, wherein each selected content item of the one or more selected content items has a height and a width, wherein the font size is selected such that a sum of the heights of the one or more selected content items is maximized for the height of the content item slot or a sum of the widths of the one or more selected content items is maximized for the width of the content item slot.

9. The system of claim 6, wherein the minimum content item size is further based on a click-through-rate.

10. The system of claim 6, wherein the minimum content item size is further based on a click-through-rate associated with a font size.

11. The system of claim 6, wherein the minimum content item size is further based on size data for one or more previously rendered content items.

12. The system of claim 6, wherein the operation of determination of the number of content items is independent of a format parameter associated with a pre-defined slot size or slot ratio.

13. A non-transitory computer readable storage device storing instructions that, when executed by one or more data processors, cause the one or more data processors to perform operations comprising:
    receiving a height of the content item slot and a width of the content item slot, wherein a ratio of the height of the content item slot to the width of the content item slot is a non-standard content item slot ratio;
    determining a number of text content items based on the height of the content item slot, the width of the content item slot, and a minimum text content item size, wherein the minimum text content item size is based on a distribution of previously rendered text content item sizes and a click-through-rate associated with a font size associated with the distribution, wherein the distribution of previously rendered text content item sizes is a truncation curve selected based on one or more requesting device parameters;
    selecting one or more text content items equal to the determined number;
    formatting the one or more selected text content items based on the minimum content item size, the height of the content item slot, and the width of the content item slot; and
    outputting data to effect display of the one or more formatted text content items.

14. The non-transitory computer readable storage device of claim 13, wherein the operation of formatting comprises:
    increasing the font size for the one or more selected text content items.

15. The non-transitory computer readable storage device of claim 14, wherein each selected text content item of the one or more selected text content items has a height and a width, wherein the font size is selected such that a sum of the heights of the one or more selected text content items is maximized for the height of the content item slot or a sum of the widths of the one or more selected text content items is maximized for the width of the content item slot.

16. The non-transitory computer readable storage device of claim 13, wherein the operation of determination of the number of text content items is independent of a format parameter associated with a pre-defined slot size or slot ratio.

17. The non-transitory computer readable storage device of claim 13, wherein the one or more requesting device parameters comprises a browser type parameter.

* * * * *